E4819 XR 3,821,705

United Sta

Chertok et al.

[11] 3,821,705

[45] June 28, 1974

[54] DATA COMMUNICATION SYSTEM AND APPARATUS

[75] Inventors: Allan Chertok, Bedford; Timothy C. Gillette, Cambridge, both of Mass.

[73] Assignee: Concord Computing Corporation, Bedford, Mass.

[22] Filed: Oct. 12, 1972

[21] Appl. No.: 296,790

[52] U.S. Cl.......... 340/152 R, 179/2 DP, 340/149 A

[51] Int. Cl........................................... H04m 11/06

[58] Field of Search............ 340/152 R, 149 A, 153, 340/154; 179/2 CA, 2 DP

[56] References Cited

UNITED STATES PATENTS

| | | | |
|---|---|---|---|
| 3,082,402 | 3/1963 | Scantlin | 340/152 R |
| 3,253,263 | 5/1966 | Lee et al. | 340/152 R |
| 3,407,387 | 10/1968 | Looschen et al. | 340/152 R |
| 3,647,972 | 5/1972 | Glover et al. | 340/149 A |
| 3,676,846 | 7/1972 | Busch | 340/146.1 BA |
| 3,697,693 | 10/1972 | Deschenes et al. | 340/152 R |
| 3,716,835 | 2/1973 | Weinberg | 340/154 |

*Primary Examiner*—Donald J. Yusko
*Attorney, Agent, or Firm*—Kenway & Jenney

[57] ABSTRACT

A system for interrogating a computer via telephone lines from a number of dispersed inquiry locations included on a party line. The system has a keyboard, a tone pair oscillator and an idle tone recognition circuit. Digital entries are made and stored at the terminal and, when the message has been completely entered, it is transmitted in tone pair code only if the terminal senses an idle tone indicating that the party line is available. At a local sub-station the initial tone pair code halts the generation of the idle tone for that party line and the total message is transmitted over trunk lines in digital bit form to the central computer. The computer reply is transmitted back in the same form to the city sub-station where it is converted through a voice response unit to a voice message for transmission along the party line to the originating terminal which includes a standard telephone receiver. The remainder of the terminals on this party line are inhibited from receiving this voice response.

4 Claims, 4 Drawing Figures

3821705

DATA COMMUNICATION SYSTEM AND APPARATUS

FIELD OF THE INVENTION

This invention relates in general to data communication systems and more particularly to a system for communication between a number of dispersed terminals and a centrally located computer.

BACKGROUND OF THE INVENTION

In modern communications there are a variety of situations in which it is desired to interrogate a computer for certain specific data from any one of a number of widely dispersed terminals. In most such cases, the interrogations cover a limited field of inquiries and the frequency of interrogation from any terminal is such that efficient operation requires time sharing of the communication channel to the computer. Examples of such applications are airline reservation systems, stock market quotation systems and credit verification and authorization systems. In general, in these situations there may be one central computer in which the information being sought is stored with a regional or national communications linkage system between the terminals where the inquiries are initiated and the computer itself. Further, in a number of these applications there will be multiple stations within a small area at a location generally remote from the computer. An example of this configuration is a credit verification system in which there are a number of retail stations within a department store which may be located in a city separate from the location of the central computer. In most communication systems of this general type, the communication link is a leased telephone line running from a multiplexing unit at the computer to a distribution sub-system at the other end of the leased line for connecting on a time shared basis the various terminals at each station. The specific desired characteristics of the communication system and of the terminals at each station will vary somewhat depending upon the particular application.

As mentioned above, one important application area is credit card verification and authorization. In credit card businesses, it has been found that relatively large economic losses occur from the use of stolen or unauthorized credit cards or the use of credit cards by holders who have become bad credit risks. In order to lessen the impact of such losses various arrangements for verifying the credit status of each individual credit card as it is used at a retail station have been employed. In general the object of the verification is for the vendor at the point of sale to institute an inquiry as to the credit status of a particular card and to receive a reply authorizing or refusing to authorize the transaction in a short time and with an additional cost loading factor compatible with obtaining an economic saving from the process.

One proposed method for credit verification has been the suggested use of a central computer to store the status of the various credit cards and use of telephone line connected terminals to directly interrogate the computer and generate in response, information sufficient to authorize or reject the transaction. It is apparent that it may be desirable to include other relevant information in the communication between the terminal and the computer, for example, an indication of the total monetary value which might be authorized and a trailing number identified with the particular inquiry so that the vendor may include this number in his sales report as an indication that verification was indeed carried out. Since the object of the system is to lessen economic losses in monetary credit transactions, the system must have a cost factor associated with it which does not itself contribute too heavily to the cost loading of the sale due to the cost of the credit verification inquiry. Cost factors include all of the equipment, as well as the leasing costs of the lines. The equipment costs include those of the computer, computer interface equipment, terminals and a sub-station which provides for the time sharing of a single trunk line by many terminals, as well as costs which may be incurred if special lines need to be installed throughout the locale of the terminals associated with a particular trunk line. Thus, if special wiring is required this may add significantly not only to the cost of installing the terminals but to the practicality of installing it where the lines would have to be installed within an already completed and decorated department store, restaurant or other retail facility.

Perhaps the most significant ongoing cost factor of such a system is the cost of the leased telephone lines. In order to achieve maximum efficiency and economic use of the lines, the data transmission through them should be at as high a speed as is compatible with effective transmissions and the number of terminals associated with a particular trunk line should be maximized within the limitations imposed by the other requirements of the system. One important factor is the tolerable time to make the inquiry without impairing customer relations at the point of sale. It has been found that a few seconds is an acceptable time for instituting an inquiry and that an acceptable "busy" rate for the equipment is one wherein no more than one in ten calls does the terminal find a "busy" line.

One proposed specific system for utilizing a central computer for credit verification employs a computer serving numerous distant remote voice response sub-stations via a multipoint data trunk. Each sub-station communicates with the computer over an independent sub-channel derived from the common data trunk via frequency division multiplex (FDM) modems. The data trunk line may travel to several cities, each city having a sub-station and FDM modem connecting a plurality of terminals to the data sub-channel derived from the trunk. In such a system, the terminals themselves, may be conventional tone pair signaling telephone instruments marketed under the name Touch-Tone, a trademark of American Telephone & Telegraph Co. By means of normal key operation or a "card dialer" mechanism and perforated credit card, a credit card number is inserted and transmitted to a local voice response sub-station via conventional PBX or public switched network telephone trunks. Each such voice trunk enters the Remote Voice Response Sub-station via a module designated a Trunk Equipment Group (TEG). The TEG converts touch-tone signals to binary data, stores this data in a buffer for subsequent transmission to the derived sub-channel via a data multiplexer. The TEG also stores the reply received from the data sub-channel and uses this data to select the appropriate words generated by a voice response unit. The selected words constitute the spoken response returned to the inquiry terminal via the PBX or public network voice trunk.

Thus the inquiry from the terminal may be initiated as a series of Touch-Tone coded numbers which are temporarily stored at the city distribution point and, when the multiplexer at that point determines that an inquiry is being stored in a TEG, it transmits the inquiry information to the computer, which will then return the authorization information in bit form to the TEG which via the voice response unit generates a voice response connected back through the TEG unit to the terminal.

While such a system is capable of the general speed of response required, the cost load factor for PBX or public network voice trunks connecting the terminals to the city distribution point is relatively high.

SUMMARY OF THE INVENTION

Broadly speaking, in the present invention a number of terminals are connected to a non-switched private party line voice-trunk. In this system each terminal has a data entry device such as a Touch-Tone keyboard or card reader and also includes sufficient data storage capability so that the entire message to be transmitted may be stored at the terminal. The terminal includes a Touch-Tone generator controlled by the stored data, a conventional telephone handset audio receiver and a special tone sensor and logic circuit, which determines the presence on the voice trunk, of an idle tone generated at the TEG which indicates that the trunk is not busy.

In operation, the message to be transmitted is keyboarded in through the Touch-Tone keyboard and stored in the terminal data storage. At completion of the entry a special button on the keyboard is depressed which provides an input signal to the logic such that, it the trunk idle tone is present, the stored information operates the Touch-Tone generator within the terminal at the highest speed at which it may operate to transmit the message in Touch-Tone form along the party line to the TEG. The TEG includes a generator for the idle tone which is cut off upon receipt of the first Touch-Tone signal pair from the terminal, thereby inhibiting all of the other terminals on the party line from transmitting or receiving. Upon transmission of the complete message, a signal generated within the terminal activates the audio circuit only at the terminal which initiated the inquiry so that it may receive a voice response message. Once it is received at the TEG, the Touch-Tone coded inquiry message is transformed by the Touch-Tone decoder into a binary code, which is transmitted to the computer via a sub-channel derived from the data trunk serving the Remote Voice Response Sub-station. The binary data message returned to the computer via the sub-channel is transformed at the Remote Voice Response substation to a voice message which is transmitted down the party line to the activated audio receiver at the terminal where the inquiry originated. At the completion of the audio message the TEG idle tone generator is again activated sending the idle tone down the line, which tone deactivates the tone sensor circuit of the originating terminal, thus rendering it again in the standby condition ready to initiate another inquiry.

In the system described, the cost of the party line voice trunk is minimal, and there is no requirement for individual lines to be run to multiple terminals within a particular retail area. The terminal itself can be made reliably and economically, requiring only a minimum of logic and tone detector and generator circuitry. It can be easily operated by the vendor, since it presents the same type of operation to him as a normal Touch-Tone telephone. The fact that the response from the computer is in voice form provides a great deal of flexibility in terms of the information transmitted back to the vendor. Additional features which may be incorporated include the automatic transmission of a terminal identification code number to identify to the computer the terminal from which the message originated and also a feature whereby, when the line is busy at the time an inquiry is instituted, the terminal automatically attempts to transmit again a few seconds later. Using these techniques it has been found that a large number of terminals may be economically and efficiently employed with a reasonably minimal number of private voice trunk facilities.

DESCRIPTION OF PREFERRED EMBODIMENTS

Figure 1:
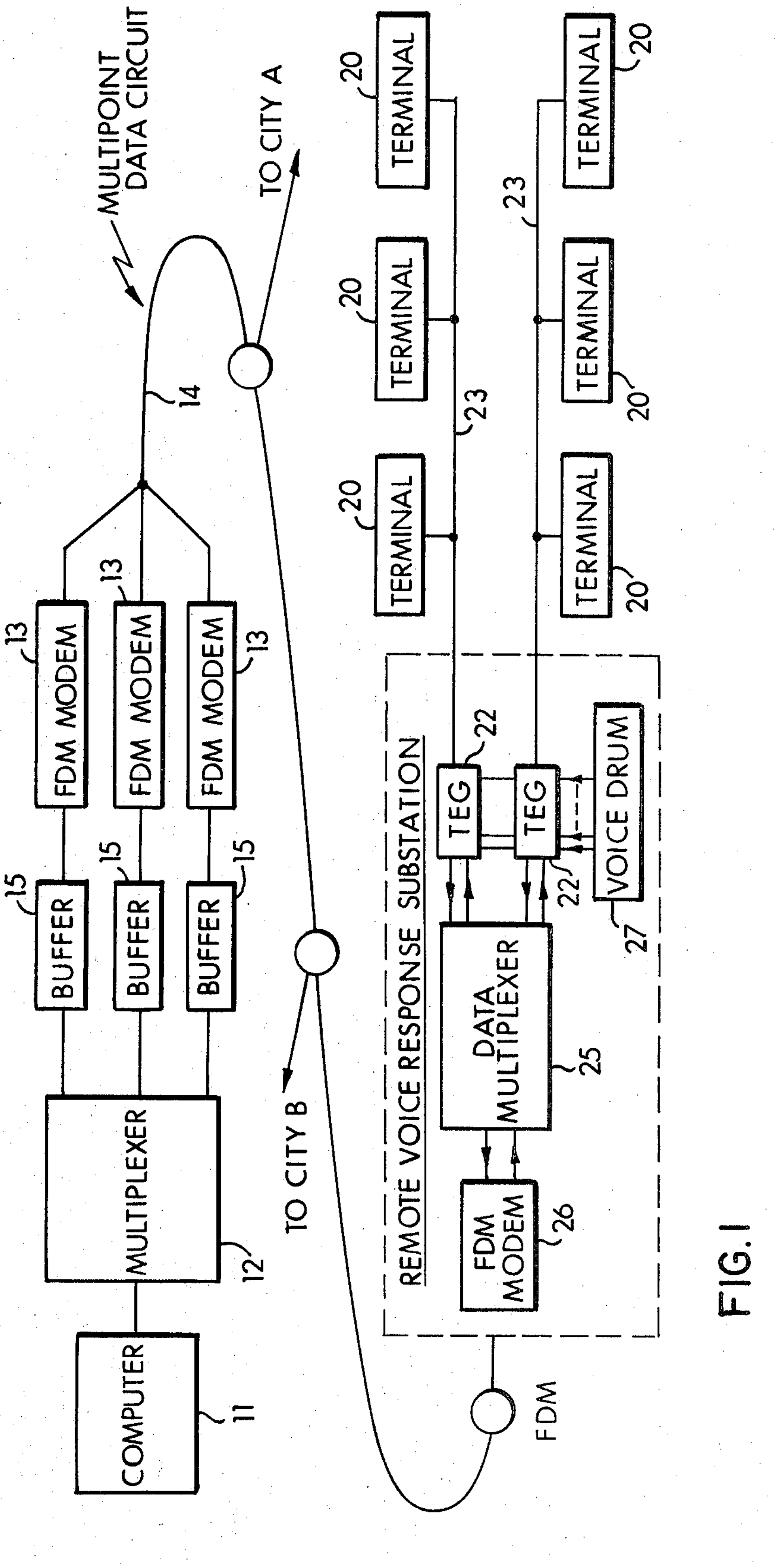
FIG. 1 is an illustration in block diagrammatic form of a data communication system constructed in accordance with the principles of this invention.

Referring now to FIG. 1, the data inquiry system of this invention is illustrated in block diagrammatic form. A central computer facility 11, which may be of conventional general purpose computer form, such as a Honeywell DDP 316 CPU with Honeywell 4720 Disk Memories is connected through a multiplexing unit 12, data buffer units 15, and a series of modem units 13 to a telephone line 14, which typically would be an inter-city telephone link, such as a multipoint voice grade circuit, connecting from the geographical location of the computer to a number of cities which may be the starting point for data inquiries. The multiplexer 12, data buffers 15, and modem units 13 may be conventional units, many being known in the art, for converting the computer output language into data bits for transmission at high efficiency over the telephone lines and for storing messages in order to provide for direct access to the computer only for those periods of time required, at computer operational speed, to enter the inquiry and to provide the output answer.

Figure 6:
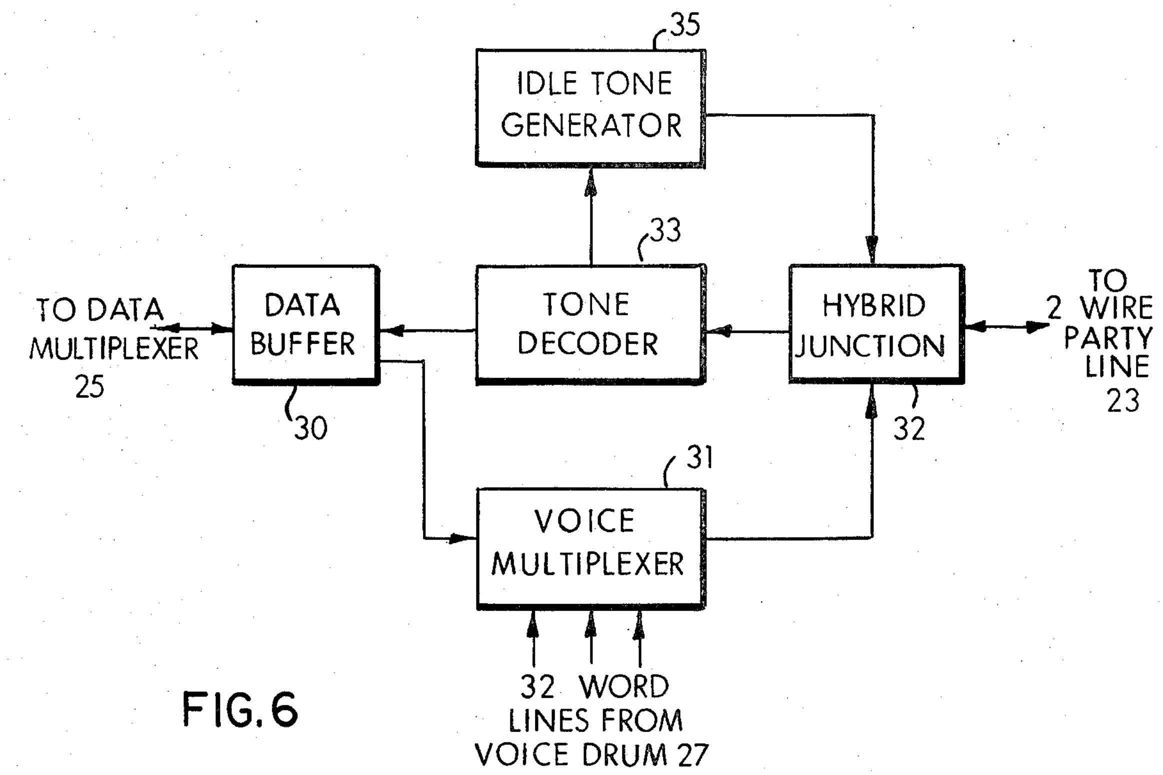
FIG. 6 is an illustration in block diagrammatic form of a trunk equipment group unit included in the data communication system of FIG. 1.

At the inquiry point of the network, a number of terminals 20 which will be described in detail below, are connected in party line fashion through a two-wire telephone line 23 to a standard buffer and distributor unit 22 designated as a Trunk Equipment Group (TEG). The TEG units are located within a Remote Voice Response Sub-station, which also includes a Data Multiplexer 25, a voice drum unit 27 and an FDM Modem 26. The voice drum unit 27 is a standard unit which provides for makeup of pre-assigned voice messages, which can be generated in response to data signals coming in over the telephone inter-city line 14, through the Modem 26 and the Data Multiplexer 25. Typically this voice unit 27 constitutes a rotating magnetic or optical memory drum containing a number of channels, each channel playing the same word repetitively and each channel having a separate output reading head. In FIG. 6 there is illustrated a typical arrangement of elements within a TEG unit. The TEG unit includes a hybrid junction 32 for coupling the party line 23 to the unit. A tone decoder 33 decodes the tone pairs signals from the party line 23 into binary data which is stored in buffer 30 for transmission to the Data Multiplexer 25. The tone decoder 33 provides an actuating signal to the idle tone generator 35 to control the generation of the idle tone. Incoming data from multiplexer 25 is supplied to the voice multiplexer 31 from the Data Buffer 30. This data then effects selection of words from voice drum 27 to constitute the voice memories transmitted over the party line 23 to the terminals 20.

Figure 2:
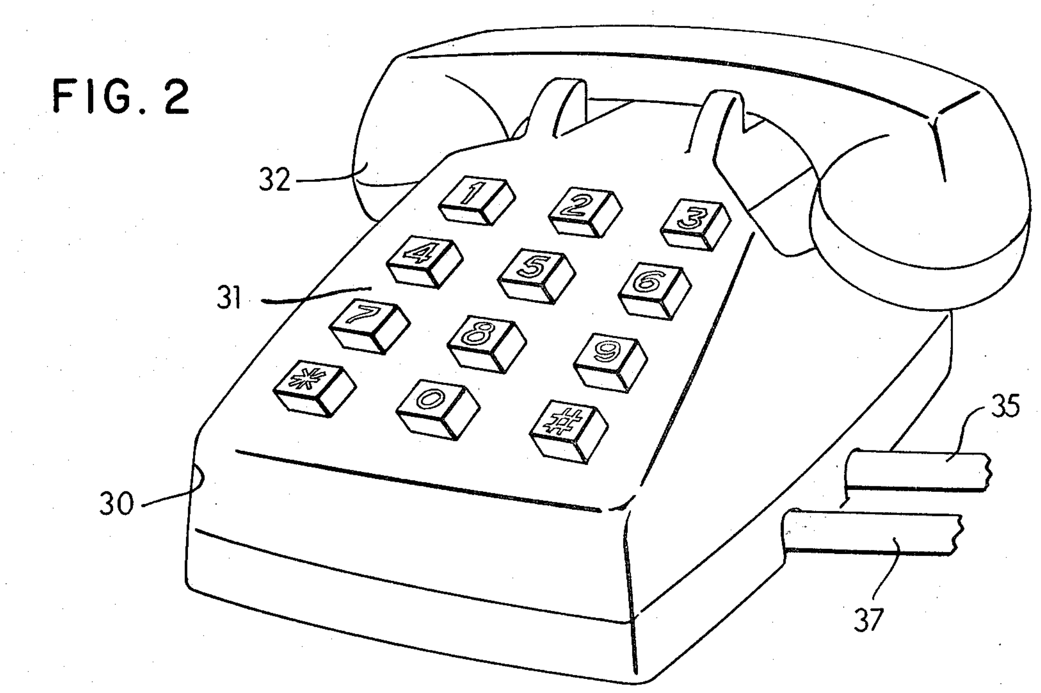
FIG. 2 is an illustration in perspective view of a terminal useful in the system of FIG. 1.

In FIG. 2 there is illustrated in perspective view a terminal set for the system. This terminal is similar in appearance to a Touch-Tone telephone set, although the internal circuitry and precise operation differs from the standard Touch-Tone telephone set. The terminal includes a housing 30 containing the circuitry and a keyboard 31 for entering decimal digits and including a key marked * which is designated the "clear" key and a key designated No. which is a "reply" key. The set includes a normal hand piece including an audio receiver 32 and is connected through line 35 to the two-wire telephone line and through cord 37 to a source of alternating current power.

The operation of the overall system is one in which, when an operator at any retail station including one of the buffered terminals 20 desires to check a credit card, he enters the credit card number to be checked into data storage within the terminal 20, by means of depressing first the "clear" key to make sure that the terminal logic is in the input state and thereafter the appropriate credit card number and any other relevant data into the terminal storage by means of depressing the keys in the keyboard 31. When he has completed this entry he depresses the "reply" key. As will be described below in more detail, the terminal includes a sensing element 55 detecting the presence or absence on the party line 23 of an idle tone generated at TEG 22 when none of the terminals 20 are transmitting or receiving. If that tone is present, actuation of the reply key causes the information entered into the storage of the terminal to be transmitted as a series of Touch-Tone signals along the party line to the TEG 22. The initial pair of Touch-Tone signals, when received at the TEG, terminates the generation of the idle down the party line 23, thus preventing any of the other terminals 20 from being enabled for transmission or reception. The complete message transmitted from the activated one of the terminals 20 along the line 23 is stored in TEG 22 until it is polled by the multiplexer 25, which polls each of its associated TEG's on a regular basis. When the TEG containing the message is polled, the message is converted into bit code and transmitted over the trunk line 14 to one of the modems 13 and through the buffer and multiplexer 12 to the computer 11 to interrogate the computer as to the status of the entered credit card number. Once the TEG 22 has been connected through multiplexer 25 to the trunk line it remains so connected until it has received back from the computer 11 along trunk line 14 a message in bit code form, which constitutes the reply from the computer. This bit code message is converted in the remote voice response portion of the unit 25 to a voice message which is coupled through the still connected TEG down the party line 23.

In the transmission cycle from the terminal 20, the actuation of the "reply" key, not only sets up the logic for initiating transmission, but also stores the "reply" binary code word in the memory 43 contained in the terminal 20 and, when this memory is employed to actuate the Touch-Tone signal generator 45 within the terminal 20, the final binary code word stored having been the "reply" code, this is also the final signal to be presented to the Touch-Tone generator. This signal then represents the end of the message being sent and, upon being recognized at a decoding element 47 within the terminal 20, this "reply" signal is used to actuate the receiver 32. The voice message signal from the voice and multiplexer unit 25, in response to the inquiry, is then received at the actuated audio receiver unit 32 and constitutes the reply to the inquiry by the operator. At the conclusion of the voice message generation at the voice and multiplexer unit 25, the "idle" signal tone is again generated from the TEG 22 and this acts to return the terminal 20 from which the inquiry was instituted, to its original state ready for another inquiry. Additionally all of the other terminals in the party line are now in a position where an inquiry may be instituted from them.

Figure 3:
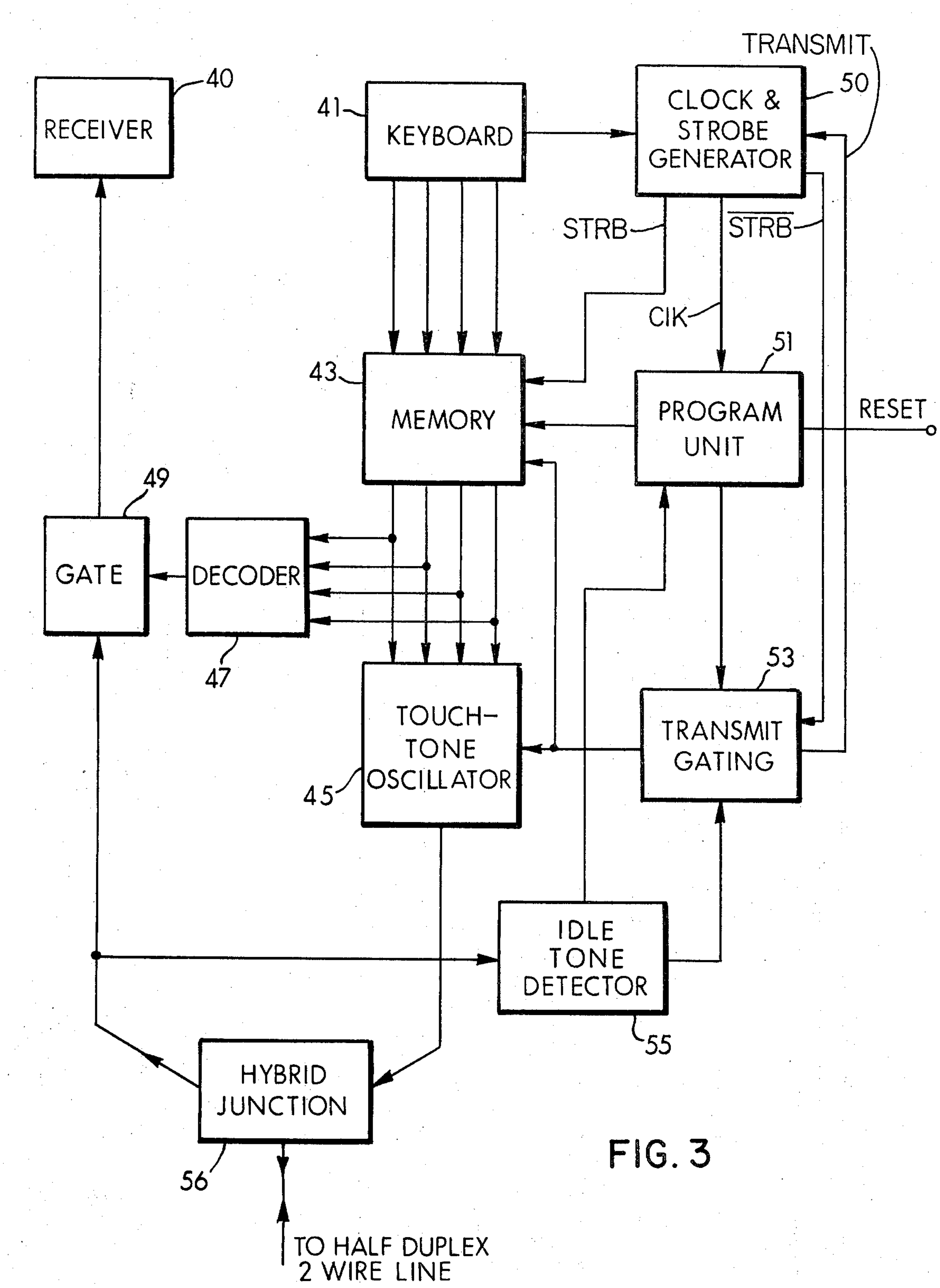
FIG. 3 is an illustration generally in block diagrammatic form of a data terminal constructed in accordance with the principles of this invention.

With reference now to FIG. 3, there is illustrated in block diagram form the components of a terminal 20. The keyboard 41 includes not only the data entry keys, but also appropriate switching circuitry to provide a four bit output code indicative of which of the 12 keys have been actuated and additionally a common key signal indicating when any key has been actuated. This latter signal is provided to a clock and strobe generator 50, while the signals indicating which of the keys have been depressed are connected to a memory unit 43. The memory unit 43 may be any suitable conventional read-write digital memory. Under the influence of signals from the clock and strobe generator 50 and from the program unit 51, the data entered into memory 43 is used to control the output from a Touch-Tone oscillator 45 through hybrid junction 56 to the telephone line 23. A transmit gating unit 53 provides signals enabling the Touch-Tone oscillator 45 only when signal from idle tone detector 55 indicates that the line 23 is "not busy." A decoder element 47 connected to the output bits from the memory 43 provides an enabling signal to gate 49 only when a four bit signal corresponding to the "reply" key having been actuated is transmitted from the memory 43 to the Touch-Tone oscillator 45. Gate 49, when enabled, allows signals transmitted from party line 23 through the hybrid junction 56 to pass to the receiver 40, where they are converted into audio signals for the operator.

The hybrid junction 56 presents a high bridging impedance to the party line 23. Accordingly the line terminating impedance is not affected by the presence of the terminals 20. This impedance may then be set by a separate resistor installed at any one of the terminal connection points on the line.

The Touch-Tone oscillator 45 is a unique design, described in copending application Ser. No. 296,791 filed Oct. 12, 1972 which responds to the actuating logic level signals in the memory 43 for generating the tone pairs, which normally would be generated directly in a conventional telephone instrument by the manual actuation of keyboard switches. The program unit 51 may take any of several convenient forms for providing actuating program signals to the memory 43 and the transmit gating 53, in addition to providing a reset signal at the end of operation for all of the units. Typically the program unit 51 might be formed of counters providing actuation signals on particular output lines in response to a specific number of clock pulses received from the clock generator 50. The transmit gating unit 53 is a logic unit for enabling the Touch-Tone oscillator 45 and for allowing the signals to be shifted from memory 43 to actuate this Touch-Tone oscillator 45 only when the idle tone detector 55 presents the "not busy" idle signal and when the program unit 51 indicates that the timing is correct in terms of "reply" key having been actuated and a strobe pulse having been received from the clock and strobe generator 50. At the completion of the operation cycle after the final response has been received from the computer, the restoration of the idle tone on the line 23 is again detected by idle tone detector 55 and a signal indicating this is provided to the program unit 51 to indicate a reset of the entire circuitry.

Figure 4:
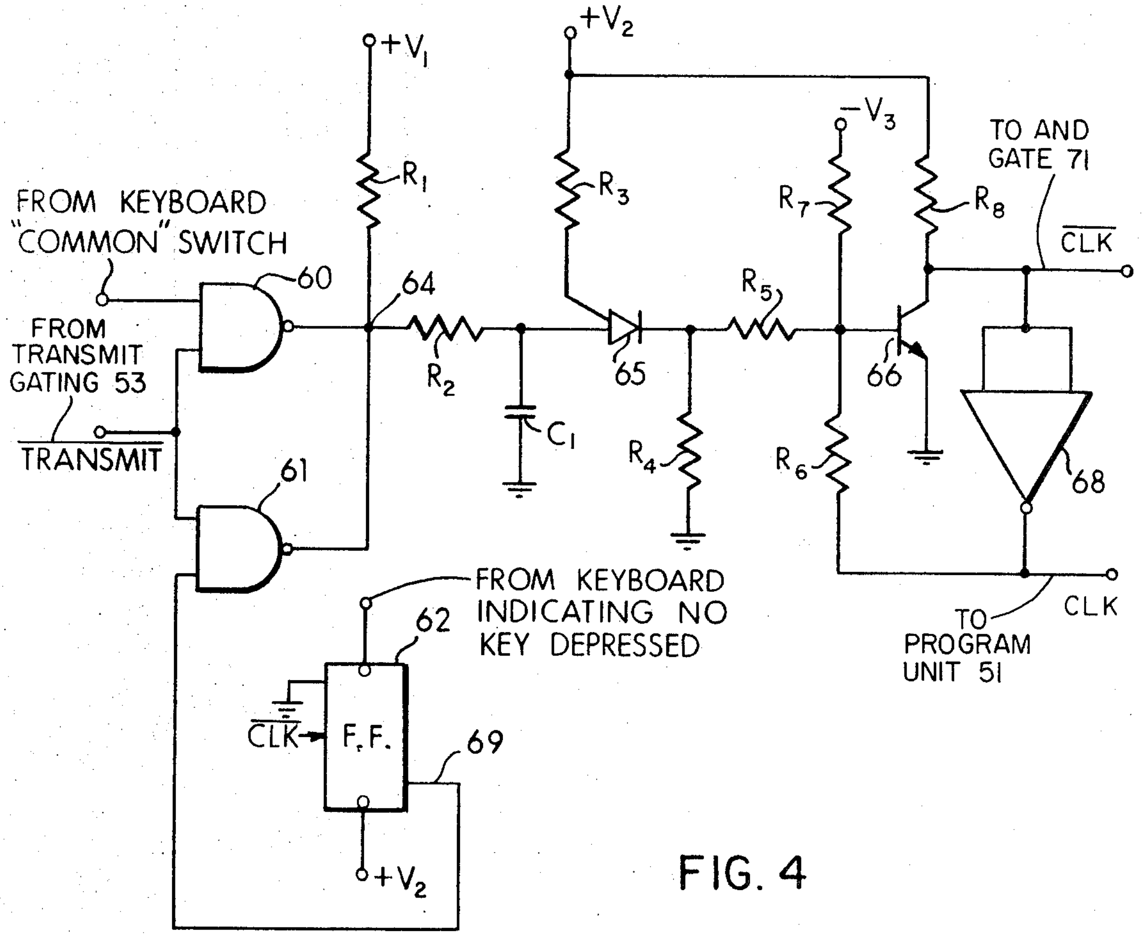
FIG. 4 is an illustration generally in schematic form of logic circuitry for inclusion in the terminal of FIG. 3.

In FIG. 4 three is illustrated partially in logic diagrammatic and partially in schematic form a circuit suitable for the clock and strobe generator circuit 50. The purpose of this circuit is to generate clock pulses, clk and clk to control the program unit 51, the shifting of information into and out of memory 43 and the generation of signals from the Touch-Tone oscillator 45. Referring to FIG. 4, a pair of open collector NAND gates 60 and 61 each have their outputs connected to a common point 64. A positive voltage supply $+V_1$ is connected through resistor $R_1$ to point 64, which is also connected through resistor $R_2$ to one terminal of capacitor $C_1$, the other terminal of capacitor $C_1$ being connected to ground. The junction between resistor $R_2$ and the terminal of capacitor $C_1$ is also connected to the anode of unijunction transistor 65. The unijunction transistor 65 is connected in series with resistor $R_3$ and resistor $R_4$ between positive voltage supply $+V_2$ and ground. The cathode of unijunction transistor 65 is connected through resistor $R_5$ to the base of transistor 66, the base being connected through resistor $R_7$ to a source of negative voltage $-V_3$. A feedback resistor $R_6$ is connected from the base to the output of inverter 68, which serves as the output terminal for the clock pulses clk. The collector of transistor 66 is connected directly to the output terminal for the clk output and is also connected through resistor $R_8$ to the positive voltage supply $+V_2$. Inverter 68 is connected between the clk terminal and the clk terminal.

The inputs to NAND gate 60 are supplied, one from the common switch on the keyboard 41, and the other from a terminal which is supplied with a transmit signal. The transmit signal is produced when the terminal is not in the transmit stage, that is between the time that the initial entry is made on the keyboard and the time the "reply" key is actuated. This transmit signal is also supplied as one input to NAND gate 61, the other input being supplied from the complement terminal of flip-flop 62. Flip-flop 62 has its actuating input connected to ground and is toggled by the trailing edge of the clk pulse.

The operation of the circuit of FIG. 4 is as follows. During the process of data entry the transmit terminal is at true logic potential, thus enabling NAND gates 60 and 61. Depressing any key in keyboard 41 causes the terminal for the common switch to be pulled down to false logic potential thereby disabling gate 60 and allowing junction 64 to float and capacitor $C_1$ to charge towards the positive value $V_1$. When the capacitor $C_1$ has charged to a voltage value equal to the gate voltage on the unijunction transistor 65, this transistor fires discharging capacitor $C_1$ through resistor $R_4$. The junction between resistors $R_4$ and $R_5$ then goes positive which turns on transistor 66, reducing the potential at the terminal clk. Consequently the terminal clk goes positive and feeds back through resistor $R_6$ to the base of transistor 66, which provides for faster turn on of transistor 66. When the junction between resistors $R_4$ and $R_5$ approaches zero, the transistor 66 turns off and clk becomes more positive. The trailing edge of the clk pulse acts on flip-flop 62 to transfer the false logic state at its input to a true logic state at the complement output 69, thereby enabling the second input to NAND gate 61 providing for grounding of junction 64, inhibiting any further action through capacitor $C_1$ and uni-junction transistor 65 while the key on the keyboard remains down. The release of the key results in a signal being applied to flip-flop 62 which holds output terminal 69 of flip-flop 62 at the false level thus maintaining the junction 64 clamped at ground.

When all of the keyboards entries have been made, the actuation of the "reply" key causes the signal to be removed from the transmit terminal disabling NAND gates 60 and 61 and allowing junction 64 again to float. Under these conditions capacitor $C_1$ and unijunction transistor 65 will operate as a relaxation oscillator producing the pulses clk and clk, at a specific frequency depending upon the circuit values. The particular period is selected to provide for maximum speed operation on the Touch-Tone oscillator, for example at a rate of 15 digits per second, to transmit the Touch-Tone pulses as rapidly as is acceptable along the party line.

Figure 5:
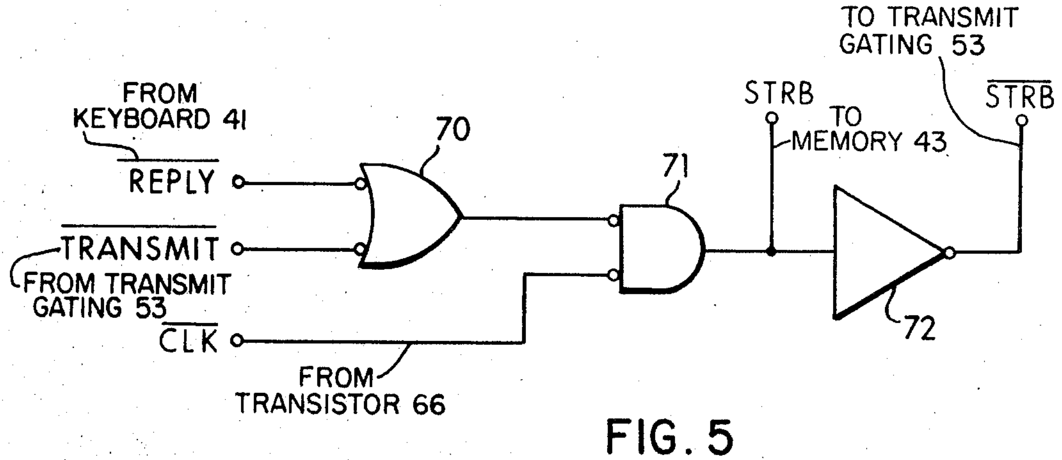
FIG. 5 is an illustration of a logic sub-system useful in the terminal of FIG. 3.

In FIG. 5 there is illustrated a gate system for generating the strobe pulses strb and strb. OR gate 70 having inverting input terminals is connected to one input leg of AND gate 71, also having inverting input terminals. The inputs to OR gate 70 include a reply terminal and a transmit terminal, while the other input to AND 71 is from a clk terminal. The output from AND gate 71 is the strb signal, and this output is connected through inverter 72 to a terminal which serves as the strb terminal. Thus the strb and strb output pulses are provided in conjunction with clock pulses when the "reply" key has not been actuated and the terminal is not transmitting, but only if a key has been depressed. These strobe pulses are applied both to enable the write function in the memory and to generate a signal, in response to the actuation of the "reply" key, to the transmit gating unit 53 to initiate transmission if the "not busy" idle tone is present.

Further gating is employed in the transmit gating element 53 to control the action of the circuit if the idle tone is not present at a time when data has been entered and the "reply" key is struck. Under these conditions the transmit gating is disabled for a suitable period of time, for example 5 seconds and then the transmit gating again attempts to initiate transmission only if an idle tone is present. The system may be arranged to run for several cycles of attempts to transmit at 5 second intervals and may include a provision for resetting and providing an audible alarm, for example, in the audio ear piece, if it is unable to obtain a non-busy line after a predetermined number of attempts.

It will be understood that while the above logic has operated with the presence of an idle signal enabling the transmission through the Touch-Tone generator, that any recognizable state of the line controlled such that when the line is not busy that state is present, and as soon as the line commences to be busy that state is changed, can be employed. For example, the idle signal could be the absence of a signal of a specific frequency such that it would not interfere with the transmission of the Touch-Tone signals and the sensing element in the terminal could then respond to the absence of this signal to enable the transmission gating 53. A terminal constructed according to the teachings of this invention provides flexible and complete operation, yet employs only a simple narrow band tone detector and, no receiver decoding, synchronism, or demodulation is required. Thus the overall cost factor of the terminals provides for an acceptable cost loading factor on the system and the terminal, since it presents the same controls to the operator as a normal Touch-Tone terminal is simple to use without elaborate training.

We claim:

1. A system for communicating between a plurality of dispersed inquiry locations and a central computer comprising:

a plurality of inquiry terminals, each located at one of said dispersed inquiry locations, a terminal distribution sub-system, a first communication data channel connecting said terminal distribution sub-system to said computer and a second voice communication channel for connecting each of said terminals to said terminal distribution sub-system, said terminal distribution sub-system including, transmission means for receiving Touch-Tone signals from said second voice communication channel and for retransmitting said signals in binary form along said first communication data channel to said computer, a voice response receiver for receiving binary signals from said computer along said first communication channel, converting said binary received signals into voice messages and retransmitting said voice messages along said second voice communication channel, signal generating means for generating along said second voice communication channel a specified channel status signal, each of said terminals including, data entry means for entering and storing a data message, receiver means for receiving said voice messages and producing an audio output in response thereto, a sensor for detecting the presence or absence on said second voice communication channel of said specified channel status signal generated at said terminal distribution sub-system, and connection means responsive to the detection of said specified channel status signal and to a complete data message stored in said data entry means for transmitting signals representing said entered data message from said terminal along said second communication voice channel to said terminal distribution sub-unit, said terminal distribution sub-system signal generator responding to the initial signal in any transmitted data message from any one of said terminals by inhibiting the generation of said specified channel status signal along said second communication channel until said receiver unit of said terminal distribution sub-system receiver unit has completed the generation of a voice message in response to said entered data, each of said terminal connection means being responsive to the absence of said specified signal from said second communication channel to disconnect its terminal from said channel unless said absence has resulted from the transmission of a data message from that terminal.

2. A system in accordance with claim 1 wherein said first and second communication channels are telephone lines, said second communication channel being a party telephone line.

3. A system in accordance with claim 2 wherein said data entry means comprises a keyboard including keys representing each of the decimal digits and an additional key to be actuated to signal the end of the data message being entered, said connection means including a tone pair signal generator for generating signal pairs under the control of signals from said data entry means.

4. A system in accordance with claim 1 wherein said signal generating means generates a signal of predetermined frequency.

* * * * *

UNITED STATES PATENT OFFICE
CERTIFICATE OF CORRECTION

Patent No. 3,821,705 Dated June 28, 1974

Inventor(s) Allan Chertok and Timothy C. Gillette

It is certified that error appears in the above-identified patent and that said Letters Patent are hereby corrected as shown below:

Column 3, line 55 reading

"to the computer via the sub-channel is transformed at"

should read

--by the computer via the sub-channel is transformed at--;

Column 6, line 37 reading

"block diagram form the components of a terminal 20."

should read

--block diagrammatic form the components of a terminal 20.--;

Column 7, line 30 reading

"to the program unit 51 to indicate a reset of the entire"

should read

--to the program unit 51 to initiate a reset of the entire--;

Column 7, line 32 reading

"In Fig. 4 three is illustrated partially in logic dia-"

should read

--In Fig. 4 there is illustrated partially in logic dia- --;

RM PO-1050 (10-69)

USCOMM-DC 60376-P69
U.S. GOVERNMENT PRINTING OFFICE 1969 O—366-334

UNITED STATES PATENT OFFICE

CERTIFICATE OF CORRECTION

Patent No. 3,821,705 Dated June 28, 1974

Inventor(s) Allan Chertok and Timothy C. Gillette

It is certified that error appears in the above-identified patent and that said Letters Patent are hereby corrected as shown below:

Column 7, line 36 reading

"clk and clk to control the program unit 51, the shifting"

should read

--clk and $\overline{clk}$ to control the program unit 51, the shifting--;

Column 7, line 57 reading

"to the output terminal for the clk output and is also"

should read

--to the output terminal for the $\overline{clk}$ output and is also--;

Column 7, line 59 reading

"supply $+V_2$. Inverter 68 is connected between the clk"

should read

--supply $+V_2$. Inverter 68 is connected between the $\overline{clk}$--;

Column 7, line 63 reading

"from a terminal which is supplied with a transmit signal."

should read

--from a terminal which is supplied with a $\overline{transmit}$ signal.--

FORM PO-1050 (10-69)

USCOMM-DC 60376-P69

U.S. GOVERNMENT PRINTING OFFICE : 1969 O—366-334

UNITED STATES PATENT OFFICE

CERTIFICATE OF CORRECTION

Patent No. 3,821,705 Dated June 28, 1974

Inventor(s) Allan Chertok and Timothy C. Gillette

It is certified that error appears in the above-identified patent and that said Letters Patent are hereby corrected as shown below:

Column 7, line 64 reading

"The transmit signal is produced when the terminal is"

should read

--The $\overline{\text{transmit}}$ signal is produced when the terminal is--;

Column 7, line 67 reading

"the "reply" key is actuated. This transmit signal is also"

should read

--the "reply" key is actuated. This $\overline{\text{transmit}}$ signal is also--;

Column 8, line 4 reading

"to ground and is toggled by the trailing edge of the clk"

should read

--to ground and is toggled by the trailing edge of the $\overline{\text{clk}}$--;

Column 8, line 7 reading

"During the process of data entry the transmit terminal"

should read

--During the process of data entry the $\overline{\text{transmit}}$ terminal--;

(M PO-1050 (10-69)

USCOMM-DC 60376-P69
U.S. GOVERNMENT PRINTING OFFICE : 1969 O—366-334.

UNITED STATES PATENT OFFICE

CERTIFICATE OF CORRECTION

Patent No. 3,821,705 Dated June 28, 1974

Inventor(s) Allan Chertok and Timothy C. Gillette

It is certified that error appears in the above-identified patent and that said Letters Patent are hereby corrected as shown below:

Column 8, line 19 reading

"minal clk. Consequently the terminal clk goes positive"

should read

--minal $\overline{\text{clk}}$. Consequently the terminal clk goes positive--;

Column 8, line 23 reading

"approaches zero, the transistor 66 turns off and clk be-"

should read

--approaches zero, the transistor 66 turns off and $\overline{\text{clk}}$ be- --;

Column 8, line 23 reading

"comes more positive. The trailing edge of the clk pulse"

should read

--comes more positive. The trailing edge of the $\overline{\text{clk}}$ pulse--;

Column 8, line 37 reading

"removed from the transmit terminal disabling NAND"

should read

--removed from the $\overline{\text{transmit}}$ terminal disabling NAND--;

M PO-1050 (10-69)
USCOMM-DC 60376-P69
U.S. GOVERNMENT PRINTING OFFICE : 1969 O—366-334.

UNITED STATES PATENT OFFICE
CERTIFICATE OF CORRECTION

Patent No. 3,821,705 Dated June 28, 1974

Inventor(s) Allan Chertok and Timothy C. Gillette

It is certified that error appears in the above-identified patent and that said Letters Patent are hereby corrected as shown below:

Column 8, line 41 reading

"ducing the pulses clk and clk, at a specific frequency"

should read

--ducing the pulses $\overline{\text{clk}}$ and clk, at a specific frequency--;

Column 8, line 49 reading

"acting the strobe pulses strb and strb. OR gate 70 having"

should read

--acting the strobe pulses strb and $\overline{\text{strb}}$. OR gate 70 having--;

Column 8, line 52 reading

"The inputs to OR gate 70 include a reply terminal and"

should read

--The inputs to OR gate 70 include a $\overline{\text{reply}}$ terminal and--;

Column 8, line 53 reading

" a transmit terminal, while the other input to AND 71"

should read

--a $\overline{\text{transmit}}$ terminal, while the other input to AND 71--;

RM PO-1050 (10-69)
USCOMM-DC 60376-P69
U.S. GOVERNMENT PRINTING OFFICE : 1969 O—366-334

UNITED STATES PATENT OFFICE
CERTIFICATE OF CORRECTION

Patent No. 3,821,705 Dated June 28, 1974

Inventor(s) Allan Chertok and Timothy C. Gillette

It is certified that error appears in the above-identified patent and that said Letters Patent are hereby corrected as shown below:

Column 8, line 54 reading

"is from a clk terminal. The output from AND gate 71"

should read

--is from a $\overline{\text{clk}}$ terminal. The output from AND gate 71--;

Column 8, line 56 reading

"inverter 72 to a terminal which serves as the strb termi-"

should read

--inverter 72 to a terminal which serves as the $\overline{\text{strb}}$ term- --;

Column 8, line 57 reading

"nal. Thus the strb and strb output pulses are provided"

should read

--nal. Thus the strb and $\overline{\text{strb}}$ output pulses are provided--

Signed and sealed this 29th day of October 1974.

(SEAL)
Attest:

McCOY M. GIBSON JR.
Attesting Officer

C. MARSHALL DANN
Commissioner of Patents

ORM PO 105 (10-69)
USCOMM-DC 60376-P69
U.S. GOVERNMENT PRINTING OFFICE : 1969 O—366-334